United States Patent
Oota et al.

(10) Patent No.: US 10,800,144 B2
(45) Date of Patent: Oct. 13, 2020

(54) LIGHT-EMITTING SHEET, INTERLAYER FOR LAMINATED GLASS, AND LAMINATED GLASS

(71) Applicant: SEKISUI CHEMICAL CO., LTD., Osaka (JP)

(72) Inventors: Yuusuke Oota, Shiga (JP); Yasuyuki Izu, Shiga (JP); Daisuke Nakajima, Shiga (JP); Atsushi Nohara, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 4 days.

(21) Appl. No.: 16/067,275

(22) PCT Filed: Feb. 9, 2017

(86) PCT No.: PCT/JP2017/004798
§ 371 (c)(1),
(2) Date: Jun. 29, 2018

(87) PCT Pub. No.: WO2017/138618
PCT Pub. Date: Aug. 17, 2017

(65) Prior Publication Data
US 2019/0022983 A1    Jan. 24, 2019

(30) Foreign Application Priority Data
Feb. 9, 2016    (JP) .................................. 2016-023153

(51) Int. Cl.
*B32B 17/10*    (2006.01)
*B32B 27/22*    (2006.01)
(Continued)

(52) U.S. Cl.
CPC .. *B32B 17/10605* (2013.01); *B32B 17/10036* (2013.01); *B32B 17/10568* (2013.01);
(Continued)

(58) Field of Classification Search
CPC ................................................. B32B 17/10669
See application file for complete search history.

(56) References Cited

U.S. PATENT DOCUMENTS

2005/0064239 A1* 3/2005 Takei .................. H01L 51/0077
428/690
2007/0178314 A1 8/2007 Marumoto
(Continued)

FOREIGN PATENT DOCUMENTS

CA    2 951 233    2/2016
EP    3 127 883    8/2017
(Continued)

OTHER PUBLICATIONS

Extended European Search Report dated Sep. 16, 2019 in corresponding European Patent Application No. 17750339.8.
(Continued)

*Primary Examiner* — Ian A Rummel
(74) *Attorney, Agent, or Firm* — Wenderoth, Lind & Ponack, L.L.P.

(57) ABSTRACT

The present invention aims to provide a luminescent sheet capable of displaying high-luminance images under irradiation with light and capable of controlling the adhesion to glass, and an interlayer film for a laminated glass and a laminated glass each including the luminescent sheet. Provided is a luminescent sheet including: a thermoplastic resin; a luminescent material; and a cyclic coordination metal compound having a five- or more-membered ring structure formed by coordinating an organic compound having in a molecule two or more atoms of at least one kind selected from oxygen, phosphor, nitrogen, and sulfur, to at least one metal selected from an alkali metal, an alkaline earth metal, and magnesium.

6 Claims, 1 Drawing Sheet

(51) Int. Cl.
*B60J 1/02* (2006.01)
*C08K 5/07* (2006.01)
*B32B 27/18* (2006.01)
*C08J 5/18* (2006.01)
*B60J 1/00* (2006.01)
*C08K 5/00* (2006.01)

(52) U.S. Cl.
CPC ........ *B32B 17/10688* (2013.01); *B32B 27/18* (2013.01); *B32B 27/22* (2013.01); *B60J 1/00* (2013.01); *B60J 1/02* (2013.01); *C08J 5/18* (2013.01); *C08K 5/0091* (2013.01); *C08K 5/07* (2013.01); *B32B 17/10669* (2013.01); *B32B 2250/02* (2013.01); *B32B 2250/03* (2013.01); *B32B 2307/412* (2013.01); *B32B 2307/422* (2013.01); *C08J 2329/14* (2013.01)

(56) References Cited

U.S. PATENT DOCUMENTS

| | | |
|---|---|---|
| 2012/0068083 A1 | 3/2012 | Labrot et al. |
| 2013/0050983 A1 | 2/2013 | Labrot et al. |
| 2015/0246508 A1 | 9/2015 | Oota et al. |

FOREIGN PATENT DOCUMENTS

| | | |
|---|---|---|
| JP | 60-245660 | 12/1985 |
| JP | 04-502525 | 5/1992 |
| JP | 2002-097041 | 4/2002 |
| JP | 2013-538172 | 10/2013 |
| WO | 91/06031 | 5/1991 |
| WO | 2006/095770 | 9/2006 |
| WO | 2010/139889 | 12/2010 |
| WO | 2014/051142 | 4/2014 |
| WO | 2015/152277 | 10/2015 |

OTHER PUBLICATIONS

International Search Report dated Apr. 25, 2017 in International (PCT) Patent Application No. PCT/JP2017/004798.

\* cited by examiner

LIGHT-EMITTING SHEET, INTERLAYER FOR LAMINATED GLASS, AND LAMINATED GLASS

TECHNICAL FIELD

The present invention relates to a luminescent sheet capable of displaying high-luminance images under irradiation with light and capable of controlling the adhesion to glass, and an interlayer film for a laminated glass and a laminated glass each including the luminescent sheet.

BACKGROUND ART

Laminated glass is less likely to scatter even when shattered by external impact and can be safely used. Due to this advantage, laminated glass has been widely used, for example, in front, side, and rear windshields of vehicles including automobiles and windowpanes of aircraft, buildings, or the like. A known example of laminated glass is a type of laminated glass including at least a pair of glass plates integrated through, for example, an interlayer film for a laminated glass which contains a liquid plasticizer and a polyvinyl acetal.

A recent growing need is the development of a head-up display (HUD) which presents meters showing vehicle driving data (e.g. driving speed information) within a driver's visual field in the front windshield of a vehicle.

Various types of HUDs are known. The most typical one is a HUD designed such that a display unit of an instrumental panel projects information (e.g. driving speed information) sent from a control unit onto a front windshield to enable a driver to view the information at a usual viewpoint, namely, within a driver's visual field in the front windshield.

An exemplary interlayer film for a laminated glass for a HUD is an interlayer film for a laminated glass having a wedge shape with a predetermined wedge angle proposed in Patent Literature 1. This interlayer film can solve a HUD's drawback that a meter image displayed on a laminated glass appears double.

Patent Literature 1 also discloses a laminated glass which is partially free from the HUD's drawback of double meter image phenomenon. Yet, not the entire face of the laminated glass is free from the double meter image phenomenon.

Patent Literature 2 discloses a laminated glass including a laminate of an interlayer film for a laminated glass containing a luminescent material between two transparent plates. The laminated glass disclosed in Patent Literature 2 produces high-contrast images under irradiation with light. However, in actual, a laminated glass including a laminate of an interlayer film for a laminated glass containing a luminescent material between two transparent plates may not produce sufficient-luminance images even under irradiation with light.

CITATION LIST

Patent Literature

Patent Literature 1: JP H4-502525 T
Patent Literature 2: WO 2010/139889

SUMMARY OF INVENTION

Technical Problem

The present invention aims to, in consideration of the state of the art, provide a luminescent sheet capable of displaying high-luminance images under irradiation with light and capable of controlling of the adhesion to glass, and an interlayer film for a laminated glass and a laminated glass each including the luminescent sheet.

Solution to Problem

The present invention relates to a luminescent sheet including: a thermoplastic resin; a luminescent material; and a cyclic coordination metal compound having a five- or more-membered ring structure formed by coordinating an organic compound having in a molecule two or more atoms of at least one kind selected from oxygen, phosphor, nitrogen, and sulfur, to at least one metal selected from an alkali metal, an alkaline earth metal, and magnesium. The present invention is specifically described in the following.

The present inventors studied about why a laminated glass including a laminate of an interlayer film for a laminated glass containing a luminescent material between two transparent plates fails to display sufficient-luminance images under irradiation with light.

An interlayer film for a laminated glass contains a compound containing an alkali metal, an alkaline earth metal, or magnesium, as an adhesion modifier for adjusting the adhesion to glass. The present inventors found out that the use of such a compound containing an alkali metal, an alkaline earth metal, or magnesium and a luminescent material in combination disadvantageously lowers the luminance. The luminescent material is typically a compound capable of being coordinated with a metal. When such a luminescent material is used together with a compound containing an alkali metal, an alkaline earth metal, or magnesium, the luminescent material is coordinated with such a metal to have a structural change, possibly resulting in a reduction in the luminance. Such a reduction in the luminance can be suppressed by reducing the amount of the compound containing an alkali metal, an alkaline earth metal, or magnesium in the interlayer film for a laminated glass. However, in the case where the amount of the compound containing an alkali metal, an alkaline earth metal, or magnesium is reduced, the control of the adhesion to glass becomes difficult.

The present inventors used a cyclic coordination metal compound having a five- or more-membered ring structure formed by coordinating an organic compound having in a molecule two or more atoms of at least one kind selected from oxygen, phosphor, nitrogen, and sulfur, to at least one metal selected from an alkali metal, an alkaline earth metal, and magnesium. They found out that the use of such compound enables display of high-luminance images under irradiation with light while the adhesion to glass is controlled. Thus, the present invention was completed.

The luminescent sheet of the present invention contains a thermoplastic resin.

Any thermoplastic resin may be used, and examples thereof include polyvinyl acetals, ethylene-vinyl acetate copolymer resins, ethylene-acryl copolymer resins, polyurethane resins, polyurethane resins containing sulfur element, polyvinyl alcohol resins, vinyl chloride resins, polyethylene terephthalate resins, polyoxymethylene (or polyacetal) resins, acetoacetal resins, polyvinyl benzyl acetal resins, and polyvinyl cuminacetal resins. Suitable among these are polyvinyl acetals because when a polyvinyl acetal is used with a plasticizer, the resulting interlayer film for a laminated glass has excellent adhesion to glass.

The polyvinyl acetal is not particularly limited as long as it is obtained by acetalizing polyvinyl alcohol with an aldehyde, and is preferably polyvinyl butyral. Two or more kinds of polyvinyl acetals may be used in combination.

The lower limit of the degree of acetalization of the polyvinyl acetal is preferably 40 mol % and the upper limit thereof is preferably 85 mol %. The lower limit is more preferably 60 mol % and the upper limit is more preferably 75 mol %.

The lower limit of the hydroxy group content of the polyvinyl acetal is preferably 15 mol % and the upper limit thereof is preferably 35 mol %. When the hydroxy group content is 15 mol % or more, formation of the luminescent sheet is facilitated. When the hydroxy group content is 35 mol % or less, the luminescent sheet to be obtained is easy to handle. The degree of acetalization and the hydroxy group content can be measured in accordance with, for example, "Testing methods for polyvinyl butyral" in JIS K 6728.

The polyvinyl acetal can be prepared by acetalizing polyvinyl alcohol with an aldehyde. The polyvinyl alcohol is normally prepared by saponifying polyvinyl acetate. Polyvinyl alcohol commonly used has a degree of saponification of 70 to 99.8 mol %.

The lower limit of the degree of polymerization of the polyvinyl alcohol is preferably 500 and the upper limit thereof is preferably 4,000. When the polyvinyl alcohol has a degree of polymerization of 500 or more, the laminated glass obtained using an interlayer film for a laminated glass including the luminescent sheet has higher penetration resistance. When the polyvinyl alcohol has a degree of polymerization of 4,000 or less, formation of the luminescent sheet is facilitated. The lower limit of the degree of polymerization of the polyvinyl alcohol is more preferably 1,000 and the upper limit thereof is more preferably 3,600.

The aldehyde is not particularly limited. Commonly, preferred is a C1-C10 aldehyde. The C1-C10 aldehyde is not particularly limited, and examples thereof include n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, and benzaldehyde. Preferred among these are n-butyraldehyde, n-hexylaldehyde, and n-valeraldehyde, and more preferred is n-butyraldehyde. The aldehyde may also be polyvinyl benzyl aldehyde, polyvinyl cuminaldehyde, or the like. These aldehydes may be used alone or in combination of two or more thereof.

The luminescent sheet of the present invention preferably further contains a plasticizer.

Any plasticizer may be used, and examples thereof include organic ester plasticizers such as monobasic organic acid esters and polybasic organic acid esters, and phosphoric acid plasticizers such as organophosphate plasticizers and organophosphite plasticizers. The plasticizer is preferably a liquid plasticizer.

The monobasic organic acid esters are not particularly limited, and examples thereof include glycol esters obtained by a reaction between glycol (e.g., triethylene glycol, tetraethylene glycol, tripropylene glycol) and a monobasic organic acid (e.g., butyric acid, isobutyric acid, caproic acid, 2-ethylbutyric acid, heptanoic acid, n-octylic acid, 2-ethylhexylic acid, pelargonic acid (n-nonylic acid), decylic acid). In particular, preferred are triethylene glycol dicaproic acid ester, triethylene glycol di-2-ethylbutyric acid ester, triethylene glycol di-n-octylic acid ester, and triethylene glycol di-2-ethylhexylic acid ester.

The polybasic organic acid esters are not particularly limited, and examples thereof include ester compounds of a polybasic organic acid (e.g., adipic acid, sebacic acid, azelaic acid) with a C4-C8 linear or branched alcohol. In particular, preferred are dibutyl sebacic acid ester, dioctyl azelaic acid ester, and dibutyl carbitol adipic acid ester.

The organic ester plasticizers are not particularly limited, and examples thereof include triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, tetraethylene glycol di-2-ethylhexanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexylcyclohexyl adipate, diisononyl adipate, heptylnonyl adipate, dibutyl sebacate, oil-modified alkyd sebacate, mixtures of phosphoric acid esters and adipic acid esters, adipic acid esters, mixed type adipic acid esters prepared from C4-C9 alkyl alcohols and C4-C9 cyclic alcohols, and C6-C8 adipic acid esters such as hexyl adipate.

The organophosphate plasticizers are not particularly limited, and examples thereof include tributoxyethyl phosphate, isodecylphenyl phosphate, and triisopropyl phosphate.

Among these, the plasticizer is preferably at least one selected from the group consisting of dihexyl adipate (DHA), triethylene glycol di-2-ethylhexanoate (3GO), tetraethylene glycol di-2-ethylhexanoate (4GO), triethylene glycol di-2-ethylbutyrate (3GH), tetraethylene glycol di-2-ethylbutyrate (4GH), tetraethylene glycol di-n-heptanoate (4G7), and triethylene glycol di-n-heptanoate (3G7).

For less hydrolysis, the plasticizer preferably contains triethylene glycol di-2-ethylhexanoate (3GO), triethylene glycol di-2-ethylbutyrate (3GH), tetraethylene glycol di-2-ethylhexanoate (4GO), or dihexyl adipate (DHA), more preferably tetraethylene glycol di-2-ethylhexanoate (4GO) or triethylene glycol di-2-ethylhexanoate (3GO), particularly preferably triethylene glycol di-2-ethylhexanoate.

The amount of the plasticizer in the luminescent sheet of the present invention is not particularly limited. The lower limit is preferably 30 parts by weight and the upper limit is preferably 100 parts by weight, relative to 100 parts by weight of the thermoplastic resin. When the amount of the plasticizer is 30 parts by weight or more, the luminescent sheet has a lower melt viscosity, which facilitates formation of the luminescent sheet. When the amount of the plasticizer is 100 parts by weight or less, the luminescent sheet has higher transparency. The lower limit of the amount of the plasticizer is more preferably 35 parts by weight and the upper limit thereof is more preferably 80 parts by weight. The lower limit is still more preferably 45 parts by weight and the upper limit is still more preferably 70 parts by weight. The lower limit is particularly preferably 50 parts by weight and the upper limit is particularly preferably 63 parts by weight.

The luminescent sheet of the present invention contains a luminescent material.

Any luminescent material that becomes luminous under irradiation with light to display images can be used. The light with which the luminescent material is irradiated is commonly referred to as excitation light, and light with various wavelengths can be used, such as UV light, infrared light, or visible light. The luminescent material may be any material that becomes luminous under irradiation with excitation light, and the luminescent light is not particularly limited. It may be UV light, infrared light, or visible light. For the purpose of displaying images, visible light is preferred.

The luminescent material is preferably a compound having a terephthalic acid ester structure or a lanthanoid complex. The luminescent material is more preferably a lanthanoid complex because the effect of preventing a reduction in the luminance caused by a structural change of the luminescent material due to the use of a cyclic coordination metal compound can be markedly achieved.

These luminescent materials become luminous at high luminance under irradiation with light such as UV light or infrared light to enable display of images.

The lower limit of the amount of the luminescent material in the luminescent sheet of the present invention is preferably 0.001 parts by weight and the upper limit thereof is preferably 15 parts by weight, relative to 100 parts by weight of the thermoplastic resin. When the amount of the luminescent material is within this range, the resulting luminescent sheet has high transparency and is capable of displaying high-luminance images under irradiation with light. The lower limit of the amount of the luminescent material is more preferably 0.01 parts by weight and the upper limit thereof is more preferably 10 parts by weight. The lower limit is still more preferably 0.05 parts by weight and the upper limit is still more preferably 8 parts by weight. The lower limit is particularly preferably 0.1 parts by weight and the upper limit is particularly preferably 5 parts by weight. The upper limit is most preferably 1 part by weight.

Examples of the compound having a terephthalic acid ester structure include compounds having a structure represented by the formula (1) and compounds having a structure represented by the formula (2). Each of these may be used alone or in combination of two or more thereof.

In the formula (1), $R^1$ is an organic group and x is 1, 2, 3, or 4. For higher transparency of the interlayer film for a laminated glass, x is preferably 1 or 2, and the compound has a hydroxy group more preferably at 2 or 5 position of the benzene ring, still more preferably at 2 and 5 positions of the benzene ring.

The organic group of $R^1$ is preferably a hydrocarbon group, more preferably a C1-C10 hydrocarbon group, still more preferably a C1-C5 hydrocarbon group, particularly preferably a C1-C3 hydrocarbon group. When the hydrocarbon group has a carbon number of 10 or smaller, the compound having a terephthalic acid ester structure can be easily dispersed in the interlayer film for a laminated glass. The hydrocarbon group is preferably an alkyl group.

Examples of the compound having a structure represented by the formula (1) include diethyl-2,5-dihydroxyterephthalate and dimethyl 2,5-dihydroxyterephthalate. In particular, for display of higher contrast images, the compound having a structure represented by the formula (1) is preferably diethyl-2,5-dihydroxylterephthalate ("diethyl 2,5-dihydroxyterephthalate" available from Sigma-Aldrich).

In the formula (2), $R^2$ is an organic group, $R^3$ and $R^4$ each are a hydrogen atom or an organic group, and y is 1, 2, 3, or 4.

The organic group of $R^2$ is preferably a hydrocarbon group, more preferably a C1-C10 hydrocarbon group, still more preferably a C1-C5 hydrocarbon group, particularly preferably a C1-C3 hydrocarbon group. When the hydrocarbon group has a carbon number satisfying the upper limit, the compound having a terephthalic acid ester structure can be easily dispersed in the interlayer film for a laminated glass. The hydrocarbon group is preferably an alkyl group.

In the formula (2), $NR^3R^4$ is an amino group. $R^3$ and $R^4$ each are preferably a hydrogen atom. The benzene ring in the compound having a structure represented by the formula (2) may have the amino group(s) at the position(s) of one hydrogen atom, two hydrogen atoms, three hydrogen atoms, or four hydrogen atoms among hydrogen atoms of the benzene ring.

For display of still higher contrast images, the compound having a structure represented by the formula (2) is preferably diethyl-2,5-diaminoterephthalate (Sigma-Aldrich).

The amount of the compound having a terephthalic acid ester structure in the luminescent sheet of the present invention is not particularly limited, and the lower limit thereof is preferably 0.001 parts by weight and the upper limit is preferably 15 parts by weight, relative to 100 parts by weight of the thermoplastic resin. When the amount of the compound having a terephthalic acid ester structure is within this range, the luminescent sheet has high transparency and can display high-luminance images under irradiation with light. The lower limit of the amount of the compound having a terephthalic acid ester structure is more preferably 0.01 parts by weight and the upper limit thereof is more preferably 10 parts by weight. The lower limit is still more preferably 0.1 parts by weight and the upper limit is still more preferably 8 parts by weight. The lower limit is particularly preferably 0.5 parts by weight and the upper limit is particularly preferably 5 parts by weight.

Examples of the lanthanoid complex include a lanthanoid complex with a multidentate ligand containing a halogen atom. Such a lanthanoid complex becomes luminous at a high intensity under irradiation with light. In particular, a lanthanoid complex with a bidentate ligand containing a halogen atom or a lanthanoid complex with a tridentate ligand containing a halogen atom is preferably used because of the ability to become luminous at a higher intensity under irradiation with light. Other examples of the lanthanoid complex with a multidentate ligand containing a halogen atom include lanthanoid complexes with a tetradentate ligand containing a halogen atom, lanthanoid complexes with a pentadentate ligand containing a halogen atom, and lanthanoid complexes with a hexadentate ligand containing a halogen atom.

As used herein, examples of the lanthanoid include lanthanum, cerium, praseodymium, neodymium, promethium, samarium, europium, gadolinium, terbium, dysprosium, holmium, erbium, thulium, ytterbium, and lutetium. For higher emission intensity, the lanthanoid is preferably neodymium, europium, or terbium, more preferably europium or terbium, still more preferably europium.

Examples of the lanthanoid complexes with a bidentate ligand containing a halogen atom include tris(trifluoroacetylacetone)phenanthroline europium (Eu(TFA)₃phen), tris(trifluoroacetylacetone)diphenyl phenanthroline europium (Eu(TFA)₃dpphen), tris(hexafluoroacetylacetone)phenanthroline europium (Eu(HFA)₃phen), tris(hexafluoroacetylacetone)diphenyl phenanthroline europium, tris(hexafluoroacetylacetone)bis(triphenylphosphine) europium, tris(trifluoroacetylacetone)2,2'-bipyridine europium, tris(hexafluoroacetylacetone)2,2'-bipyridine europium, tris(5,5,6,6,7,7,7-heptafluoro-2,4-pentanedionate)2,2'-bipyridine europium ([Eu(FPD)₃]bpy), tris(trifluoroacetylacetone)3,4,7,8-tetramethyl-1,10 phenanthroline europium ([Eu(TFA)₃]tmphen), and tris(5,5,6,6,7,7,7-heptafluoro-2,4-pentanedionate)phenanthroline europium ([Eu(FPD)₃]phen).

Other examples of the lanthanoid complexes with a bidentate ligand containing a halogen atom include tris(trifluoroacetylacetone)phenanthroline terbium (Tb(TFA)₃phen), tris(trifluoroacetylacetone)diphenyl phenanthroline terbium (Tb(TFA)₃dpphen), tris(hexafluoroacetylacetone)phenanthroline terbium (Tb(HFA)₃phen), tris(hexafluoroacetylacetone)diphenyl phenanthroline terbium, tris(hexafluoroacetylacetone)bis(triphenylphosphine)terbium, tris(trifluoroacetylacetone)2,2'-bipyridine terbium, tris(hexafluoroacetylacetone)2,2'-bipyridine terbium, tris(5,5,6,6,7,7,7-heptafluoro-2,4-pentanedionate)2,2'-bipyridine terbium ([Tb(FPD)₃]bpy), tris(trifluoroacetylacetone)3,4,7,8-tetramethyl-1,10 phenanthroline terbium ([Tb(TFA)₃]tmphen), and tris(5,5,6,6,7,7,7-heptafluoro-2,4-pentanedionate)phenanthroline terbium ([Tb(FPD)₃]phen).

Examples of the lanthanoid complexes with a tridentate ligand containing a halogen atom include terpyridine trifluoroacetylacetone europium and terpyridine hexafluoroacetylacetone europium. Other examples thereof include terpyridine trifluoroacetylacetone terbium and terpyridine hexafluoroacetylacetone terbium.

Examples of the halogen atom in the lanthanoid complex with a multidentate ligand containing a halogen atom include a fluorine atom, a chlorine atom, a bromine atom, and an iodine atom. Preferred is a fluorine atom for better stability of the ligand structure.

The lanthanoid complex with a multidentate ligand containing a halogen atom is preferably a lanthanoid complex with a bidentate ligand containing a halogen atom and having an acetylacetone skeleton because of its excellent initial luminescent properties.

Examples of the lanthanoid complex with a bidentate ligand containing a halogen atom and having an acetylacetone skeleton include Eu(TFA)₃phen, Eu(TFA)₃dpphen, Eu(HFA)₃phen, [Eu(FPD)₃]bpy, [Eu(TFA)₃]tmphen, and [Eu(FPD)₃]phen. Other examples of the lanthanoid complex with a bidentate ligand containing a halogen atom and having an acetylacetone skeleton include Tb(TFA)₃phen, Tb(TFA)₃dpphen, Tb(HFA)₃phen, [Tb(FPD)₃]bpy, [Tb(TFA)₃]tmphen, and [Tb(FPD)₃]phen. The structures of these lanthanoid complexes with a bidentate ligand containing a halogen atom and having an acetylacetone skeleton are shown below.

Eu(TFA)₃phen

[Eu(TFA)₃]tmphen

Eu(TFA)₃dpphen

[Eu(TFA)₃]tmphen

[Eu(HFA)₃]phen

[Eu(FPD)₃]phen

The lanthanoid complex with a multidentate ligand containing a halogen atom is preferably in the form of particles. The lanthanoid complex with a multidentate ligand containing a halogen atom in the form of particles can be readily dispersed in the interlayer film for a laminated glass.

In the case where the lanthanoid complex with a multidentate ligand containing a halogen atom is in the form of particles, the lower limit of the average particle size of the lanthanoid complex is preferably 0.01 µm and the upper limit thereof is preferably 10 µm. The lower limit is more preferably 0.03 µm and the upper limit is more preferably 1 µm.

The lower limit of the amount of the lanthanoid complex in the luminescent sheet of the present invention is preferably 0.001 parts by weight and the upper limit thereof is preferably 10 parts by weight, relative to 100 parts by weight of the thermoplastic resin. When the amount of the lanthanoid complex is within this range, the luminescent sheet has high transparency and can display high-luminance images under irradiation with light. The lower limit of the amount of the lanthanoid complex is more preferably 0.01 parts by weight and the upper limit thereof is more preferably 5 parts by weight. The lower limit is still more preferably 0.05 parts by weight and the upper limit is still more preferably 1 part by weight. The lower limit is particularly preferably 0.2 parts by weight.

The luminescent sheet of the present invention contains a cyclic coordination metal compound having a five- or more-membered ring structure formed by coordinating an organic compound having in a molecule two or more atoms of at least one kind selected from oxygen, phosphor, nitrogen, and sulfur, to at least one metal selected from an alkali metal, an alkaline earth metal, and magnesium (hereafter, also simply referred to as a "cyclic coordination metal compound"). In the luminescent sheet of the present invention, the cyclic coordination metal compound serves as an adhesion modifier for controlling the adhesion to glass. Incorporation of the cyclic coordination metal compound in which a metal forms a stable five- or more-membered ring structure by coordination can prevent a structural change of the luminescent material due to a reaction between the metal in the cyclic coordination metal compound and the luminescent material, preventing a reduction in the luminance derived from a structural change of the luminescent material.

The lower limit of the amount of the cyclic coordination metal compound in the luminescent sheet of the present invention is preferably 0.0005 parts by weight and the upper limit thereof is preferably 0.1 parts by weight, relative to 100 parts by weight of the thermoplastic resin. When the amount of the cyclic coordination metal compound is within the above preferable range, high-luminance images can be displayed under irradiation with light and the adhesion to glass can be controlled. Accordingly, a glass and a laminated glass each produced using the luminescent sheet of the present invention have high penetration resistance. The lower limit of the amount of the cyclic coordination metal compound in the luminescent sheet of the present invention is more preferably 0.001 parts by weight, still more preferably 0.005 parts by weight, particularly preferably 0.01 parts by weight. The upper limit is more preferably 0.08 parts by weight, still more preferably 0.05 parts by weight, particularly preferably 0.036 parts by weight.

The ring structure in the cyclic coordination metal compound is only required to be a five- or more-membered ring structure. For higher stability, preferred is a 6- or more-membered ring structure, more preferred is a 6- to 8-membered ring structure, and still more preferred is a 6-membered ring structure.

Examples of the cyclic coordination metal compound having a 6-membered ring structure include compounds represented by the formula (3).

(3)

In the formula (3), $R^5$ and $R^7$ each are a halogen atom or an organic group, and $R^6$ is a linear organic group having a carbon number of 1 or more. The organic group represented by $R^5$ or $R^7$ is preferably a hydrocarbon group, more preferably a C1-C10 hydrocarbon group, still more preferably a C1-C5 hydrocarbon group, particularly preferably a C1-C3 hydrocarbon group. The hydrogen atoms in the hydrocarbon group may be partly substituted with an atom other than hydrogen atom or a functional group. Examples of the C1-C3 hydrocarbon group include methyl, ethyl, and propyl groups in which no hydrogen atom is substituted and methyl, ethyl, and propyl groups in which hydrogen atoms are partly substituted with a halogen atom. The halogen atom substituting a part of the hydrogen atoms in the methyl, ethyl, and propyl groups may be fluorine atom, chlorine atom, bromine atom, or iodine atom.

In the formula (3), O may be replaced with P, N, or S, and Mg may be replaced with an alkali metal or an alkaline earth metal.

These cyclic coordination metal compounds may be used alone or in combination of two or more thereof.

The compound having a structure represented by the formula (3) is considered to be coordinated also by the structure represented by the formula (4) or (5).

(4)

In particular, the cyclic coordination metal compound contains preferably an organic compound having a β-diketone skeleton, more preferably an organic compound having an acetylacetone skeleton. Specifically, preferred is acetylacetone magnesium represented by the formula (6). The acetylacetone magnesium represented by the formula (6) is considered to be coordinated also by the structure represented by the formula (7).

The luminescent sheet of the present invention may contain a salt of at least one metal selected from an alkali metal, an alkaline earth metal, and magnesium other than the cyclic coordination metal compound. For further preventing a reduction in the luminance caused by a structural change of the luminescent material, the amount of the salt of at least one metal selected from an alkali metal, an alkaline earth metal, and magnesium other than the cyclic coordination metal compound contained in the luminescent sheet of the present invention is preferably 0.010 parts by weight or less, more preferably 0.005 parts by weight or less, still more preferably 0.001 parts by weight or less, particularly preferably 0.0005 parts by weight or less, relative to 100 parts by weight of the thermoplastic resin. Most preferably, the salt is not contained.

The luminescent sheet of the present invention preferably further contains a dispersant. The use of a dispersant can inhibit aggregation of the luminescent material, leading to further uniform luminescence.

The dispersant used may be, for example, a compound having a sulfonic acid structure such as linear alkyl benzene sulfonates; a compound having an ester structure such as diester compounds, ricinoleic acid alkyl esters, phthalic acid esters, adipic acid esters, sebacic acid esters, and phosphoric acid esters; a compound having an ether structure such as polyoxyethylene glycols, polyoxypropylene glycols, and alkyl phenyl-polyoxyethylene-ethers; a compound having a carboxylic acid structure such as polycarboxylic acids; a compound having an amine structure such as laurylamine, dimethyllaurylamine, oleyl propylenediamine, polyoxyethylene secondary amine, polyoxyethylene tertiary amine, and polyoxyethylene diamine; a compound having a polyamine structure such as polyalkylene polyamine alkylene oxide; a compound having an amide structure such as oleic acid diethanolamide and alkanol fatty acid amide; and a compound having a high-molecular-weight amide structure such as polyvinylpyrrolidone and polyester acid amidoamine salt. Also, the dispersant used may be a high-molecular-weight dispersant such as polyoxyethylene alkyl ether phosphoric acid (salt), high-molecular-weight polycarboxylic acids, and condensed ricinoleic acid esters. The high-molecular-weight dispersant is defined as a dispersant having a molecular weight of 10,000 or higher.

In the case where the luminescent sheet of the present invention contains the dispersant, the lower limit of the amount of the dispersant is preferably 1 part by weight and the upper limit thereof is preferably 50 parts by weight, relative to 100 parts by weight of the luminescent material. When the amount of the dispersant is within the above range, the luminescent material can be uniformly dispersed in the luminescent sheet. The lower limit of the amount of the dispersant is more preferably 3 parts by weight and the upper limit thereof is more preferably 30 parts by weight. The lower limit is still more preferably 5 parts by weight and the upper limit is still more preferably 25 parts by weight.

The luminescent sheet of the present invention may further contain an ultraviolet absorber. The use of an ultraviolet absorber can improve the light resistance of the luminescent sheet.

Examples of the ultraviolet absorber include compounds having a malonic acid ester structure, compounds having an oxanilide structure, compounds having a benzotriazole structure, compounds having a benzophenone structure, compounds having a triazine structure, compounds having a benzoate structure, and compounds having a hindered amine structure.

In the case where the luminescent sheet of the present invention contains the ultraviolet absorber, the upper limit of the amount of the ultraviolet absorber is preferably 1 part by weight, more preferably 0.5 parts by weight, still more preferably 0.2 parts by weight, particularly preferably 0.1 parts by weight, relative to 100 parts by weight of the thermoplastic resin. When the amount of the ultraviolet absorber is within this range, the luminescent sheet to be obtained can display higher-contrast images.

The luminescent sheet of the present invention may further contain an antioxidant. The use of an antioxidant can improve the light resistance of the luminescent sheet.

Any antioxidant may be used, and examples thereof include antioxidants having a phenol structure, antioxidants containing sulfur, and antioxidants containing phosphor.

The antioxidants having a phenol structure are antioxidants having a phenol skeleton. Examples of the antioxidants having a phenol structure include 2,6-di-t-butyl-p-cresol (BHT), butylhydroxyanisole (BHA), 2,6-di-t-butyl-4-ethylphenol, stearyl-β-(3,5-di-t-butyl-4-hydroxyphenyl) propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methylhydroxy-5-t-butylphenyl)butane, tetrakis [methylene-3-(3', 5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl) benzene, bis(3,3'-t-butylphenol)butyric acid glycol ester, and pentaerythritol tetrakis [3-(3,5-di-tert-butyl-4-hydroxyphenyl)propionate]. These antioxidants may be used alone or in combination of two or more thereof.

The luminescent sheet of the present invention may contain, if needed, additives such as light stabilizers, antistatic agents, blue pigments, blue dyes, green pigments, and green dyes.

The luminescent sheet of the present invention may have a single-layer structure or a multilayer structure. In the case where the luminescent sheet of the present invention has a multilayer structure, the luminescent material and the cyclic coordination metal compound may be contained in the same layer or in different layers.

The luminescent sheet of the present invention may be produced by any method. For example, a plasticizer solution containing a plasticizer, a luminescent material, and a cyclic coordination metal compound is well mixed with a thermoplastic resin to prepare a resin composition for luminescent sheets. Then, the resin composition is extruded using an extruder to produce a luminescent sheet.

The luminescent sheet of the present invention containing the luminescent material becomes luminous under irradiation with light having a specific wavelength. Such properties enable display of high-contrast images of information.

Examples of a device for irradiation with light having a specific wavelength include a spot light source (LC-8 available from Hamamatsu Photonixs K.K.), a xenon flash lamp (CW lamp available from Heraeus Holding), and a black light (Carry hand available from Iuchi Seieido Co., Ltd.).

The present invention also encompasses an interlayer film for a laminated glass including the luminescent sheet of the present invention.

The interlayer film for a laminated glass of the present invention may have a single layer structure consisting only of the luminescent sheet of the present invention or a multilayer structure in which the luminescent sheet of the present invention serves as a luminescent layer and a different layer is stacked on the luminescent layer. In the case where the interlayer film for a laminated glass of the present invention has a multilayer structure, the luminescent material and the cyclic coordination metal compound may be contained in the same layer or in different layers.

In the case where the interlayer film for a laminated glass of the present invention has a multilayer structure, the luminescent layer may be disposed on the entire or part of a face of the interlayer film for a laminated glass, and may be disposed on the entire or part of a face in a direction perpendicular to the thickness direction of the interlayer film for a laminated glass. In the case where the luminescent layer is partially disposed, information can be displayed only at the disposed part as a luminescent area without being displayed at the other part as a non-luminescent area.

In the case where the interlayer film for a laminated glass of the present invention has a multilayer structure, an interlayer film for a laminated glass with various functions can be produced by controlling the components constituting the luminescent layer and a different layer.

For example, in order to impart sound insulation properties to the interlayer film for a laminated glass of the present invention, the amount of the plasticizer (hereafter, also referred to as amount X) relative to 100 parts by weight of the thermoplastic resin in the luminescent layer may be controlled to be more than the amount of the plasticizer (hereafter, also referred to as amount Y) relative to 100 parts by weight of the thermoplastic resin in the different layer. In this case, the amount X is more than the amount Y preferably by 5 parts by weight or more, more preferably by 10 parts by weight or more, still more preferably by 15 parts by weight or more. For allowing the interlayer film for a laminated glass to have higher penetration resistance, the difference between the amount X and the amount Y is preferably 50 parts by weight or less, more preferably 40 parts by weight or less, still more preferably 35 parts by weight or less. The difference between the amount X and the amount Y is calculated based on the equation: (difference between the amount X and the amount Y)=(the amount X−the amount Y).

The lower limit of the amount X is preferably 45 parts by weight, more preferably 50 parts by weight, still more preferably 55 parts by weight, and the upper limit thereof is preferably 80 parts by weight, more preferably 75 parts by weight, still more preferably 70 parts by weight. When the amount X is adjusted to the preferable lower limit or more, high sound insulation properties can be exerted. When the amount X is adjusted to the preferable upper limit or less, the plasticizer can be prevented from bleeding out, so that a reduction in the transparency or the adhesiveness of the interlayer film for a laminated glass can be prevented.

The lower limit of the amount Y is preferably 20 parts by weight, more preferably 30 parts by weight, still more preferably 35 parts by weight, and the upper limit thereof is preferably 45 parts by weight, more preferably 43 parts by weight, still more preferably 41 parts by weight. When the amount Y is adjusted to the preferable lower limit or more, high penetration resistance can be exerted. When the amount Y is adjusted to the preferable upper limit or less, the plasticizer can be prevented from bleeding out, so that a reduction in the transparency or the adhesiveness of the interlayer film for a laminated glass can be prevented.

In order to impart sound insulation properties to the interlayer film for a laminated glass of the present invention, the thermoplastic resin in the luminescent layer is preferably a polyvinyl acetal X. The polyvinyl acetal X can be prepared by acetalization of polyvinyl alcohol with an aldehyde. The polyvinyl alcohol can be commonly prepared by saponification of polyvinyl acetate. The lower limit of the average degree of polymerization of the polyvinyl alcohol is preferably 200 and the upper limit thereof is preferably 5,000. When the average degree of polymerization of the polyvinyl alcohol is 200 or higher, the penetration resistance of the interlayer film for a laminated glass to be obtained can be improved. When the average degree of polymerization of the polyvinyl alcohol is 5,000 or lower, formability of the luminescent layer can be ensured. The lower limit of the average degree of polymerization of the polyvinyl alcohol is more preferably 500 and the upper limit thereof is more preferably 4,000.

The average degree of polymerization of the polyvinyl alcohol is determined by a method in accordance with "Testing methods for polyvinyl alcohol" in JIS K 6726.

The lower limit of the carbon number of an aldehyde used for acetalization of the polyvinyl alcohol is preferably 4 and the upper limit thereof is preferably 6. When an aldehyde having 4 or more carbon atoms is used, a sufficient amount of the plasticizer can be stably contained so that excellent sound insulation properties can be obtained. Moreover, bleeding out of the plasticizer can be prevented. When an aldehyde having 6 or less carbon atoms is used, synthesis of the polyvinyl acetal X is facilitated to ensure the productivity. The C4-C6 aldehyde may be a linear or branched aldehyde, and examples thereof include n-butyraldehyde and n-valeraldehyde.

The upper limit of the hydroxy group content of the polyvinyl acetal X is preferably 30 mol %. When the hydroxy group content of the polyvinyl acetal X is 30 mol % or less, the plasticizer can be contained in an amount needed for exhibiting sound insulation properties, and bleeding out of the plasticizer can be prevented. The upper limit of the hydroxy group content of the polyvinyl acetal X is more preferably 28 mol %, still more preferably 26 mol %, particularly preferably 24 mol %, and the lower limit thereof is preferably 10 mol %, more preferably 15 mol %, still more preferably 20 mol %. The hydroxy group content of the polyvinyl acetal X is a value in percentage (mol %) of the mol fraction obtained by dividing the amount of ethylene groups to which hydroxy groups are bonded by the amount of all the ethylene groups in the main chain. The amount of ethylene groups to which hydroxy groups are bonded can be determined by measuring the amount of ethylene groups to which hydroxy group are bonded in the polyvinyl acetal X by a method in accordance with "Testing methods for polyvinyl butyral" in JIS K 6728.

The lower limit of the acetal group content of the polyvinyl acetal X is preferably 60 mol % and the upper limit thereof is preferably 85 mol %. When the acetal group content of the polyvinyl acetal X is 60 mol % or more, the luminescent layer has higher hydrophobicity and can contain the plasticizer in an amount needed for exhibiting sound insulation properties, and bleeding out of the plasticizer and whitening can be prevented. When the acetal group content of the polyvinyl acetal X is 85 mol % or less, synthesis of the polyvinyl acetal X is facilitated to ensure the productivity. The lower limit of the acetal group content of the polyvinyl acetal X is more preferably 65 mol %, still more preferably 68 mol % or more.

The acetal group content can be determined by measuring the amount of ethylene groups to which acetal groups are bonded in the polyvinyl acetal X by a method in accordance with "Testing methods for polyvinyl butyral" in JIS K 6728.

The lower limit of the acetyl group content of the polyvinyl acetal X is preferably 0.1 mol % and the upper limit thereof is preferably 30 mol %. When the acetyl group content of the polyvinyl acetal X is 0.1 mol % or more, the plasticizer can be contained in an amount needed for exhibiting sound insulation properties, and bleeding out of the plasticizer can be prevented. When the acetyl group content of the polyvinyl acetal X is 30 mol % or less, the luminescent layer has higher hydrophobicity to prevent whitening. The lower limit of the acetyl group content is more preferably 1 mol %, still more preferably 5 mol %, particularly preferably 8 mol %, and the upper limit thereof is more preferably 25 mol %, still more preferably 20 mol %. The acetyl group content is a value in percentage (mol %) of the mol fraction obtained by subtracting the amount of ethylene groups to which acetal groups are bonded and the amount of ethylene groups to which hydroxy group are bonded from the amount of all the ethylene groups in the main chain and dividing the resulting value by the amount of all the ethylene groups in the main chain.

The polyvinyl acetal X is especially preferably a polyvinyl acetal with the acetyl group content of 8 mol % or more or a polyvinyl acetal with the acetyl group content of less than 8 mol % and the acetal group content of 65 mol % or more. In this case, the luminescent layer can readily contain the plasticizer in an amount needed for exhibiting sound insulation properties. The polyvinyl acetal X is more preferably a polyvinyl acetal having the acetyl group content of 8 mol % or more or a polyvinyl acetal having the acetyl group content of less than 8 mol % and the acetal group content of 68 mol % or more.

In order to impart sound insulation properties to the interlayer film for a laminated glass of the present invention, the thermoplastic resin in the different layer is preferably a polyvinyl acetal Y. The polyvinyl acetal Y preferably has a greater hydroxy group content than the polyvinyl acetal X.

The polyvinyl acetal Y can be prepared by acetalization of polyvinyl alcohol with an aldehyde. The polyvinyl alcohol can be commonly obtained by saponification of polyvinyl acetate. The lower limit of the average degree of polymerization of the polyvinyl alcohol is preferably 200 and the upper limit thereof is preferably 5,000. When the average degree of polymerization of the polyvinyl alcohol is 200 or more, the penetration resistance of the interlayer film for a laminated glass can be improved. When the average degree of polymerization of the polyvinyl alcohol is 5,000 or less, the formability of the different layer can be ensured. The lower limit of the average degree of polymerization of the polyvinyl alcohol is more preferably 500 and the upper limit thereof is more preferably 4,000.

The lower limit of the carbon number of an aldehyde used for acetalization of the polyvinyl alcohol is preferably 3 and the upper limit thereof is preferably 4. When the aldehyde having 3 or more carbon atoms is used, the penetration resistance of the interlayer film for a laminated glass is improved. When the aldehyde having 4 or less carbon atoms is used, the productivity of the polyvinyl acetal Y is improved. The C3-C4 aldehyde may be a linear or branched aldehyde, and examples thereof include n-butyraldehyde.

The upper limit of the hydroxy group content of the polyvinyl acetal Y is preferably 33 mol % and the lower limit thereof is preferably 28 mol %. When the hydroxy group content of the polyvinyl acetal Y is 33 mol % or less, whitening of the interlayer film for a laminated glass can be prevented. When the hydroxy group content of the polyvinyl acetal Y is 28 mol % or more, the penetration resistance of the interlayer film for a laminated glass can be improved.

The lower limit of the acetal group content of the polyvinyl acetal Y is preferably 60 mol % and the upper limit thereof is preferably 80 mol %. When the acetal group content is 60 mol % or more, the plasticizer in an amount needed for exhibiting sufficient penetration resistance can be contained. When the acetal group content is 80 mol % or less, the adhesiveness between the different layer and glass can be ensured. The lower limit of the acetal group content is more preferably 65 mol % and the upper limit thereof is more preferably 69 mol %.

The upper limit of the acetyl group content of the polyvinyl acetal Y is preferably 7 mol %. When the acetyl group content of the polyvinyl acetal Y is 7 mol % or less, the different layer has higher hydrophobicity, thereby preventing whitening. The upper limit of the acetyl group content is more preferably 2 mol %, and the lower limit thereof is preferably 0.1 mol %. The hydroxy group content, acetal group content, and acetyl group content of the polyvinyl acetal Y can be measured by the same methods as those described for the polyvinyl acetal X.

In order to impart heat insulation properties to the interlayer film for a laminated glass of the present invention, for example, one, two, or all of the luminescent layer and different layer(s) may contain a heat ray absorber.

The heat ray absorber is not particularly limited as long as it blocks infrared rays. Preferred is at least one selected from the group consisting of tin-doped indium oxide (ITO) particles, antimony-doped tin oxide (ATO) particles, aluminum-doped zinc oxide (AZO) particles, indium-doped zinc oxide (IZO) particles, tin-doped zinc oxide particles, silicon-doped zinc oxide particles, lanthanum hexaboride particles, and cerium hexaboride particles.

In the case where the luminescent layer contains a heat ray absorber, the amount of the heat ray absorber in 100% by weight of the luminescent layer is preferably 0.00001% by weight or more and 1% by weight or less. In the case where the different layer contains a heat ray absorber, the amount of the heat ray absorber in 100% by weight of the different layer is preferably 0.00001% by weight or more and 1% by weight or less. When the amount of the heat ray absorber in the luminescent layer or the different layer is within the above preferable range, sufficient heat insulation properties can be exhibited.

The thickness of the interlayer film for a laminated glass of the present invention is not particularly limited. The lower limit of the thickness is preferably 50 μm and the upper limit thereof is preferably 2,200 μm. The lower limit is more preferably 100 μm and the upper limit is more preferably 1,700 μm. The upper limit is still more preferably 1,000 μm, particularly preferably 900 μm. The lower limit of the thickness of the entire interlayer film for a laminated glass means the thickness of the thinnest part of the entire interlayer film for a laminated glass. The upper limit of the thickness of the entire interlayer film for a laminated glass means the thickness of the thickest part of the entire interlayer film for a laminated glass.

In the case where the interlayer film for a laminated glass of the present invention has a multilayer structure, the thickness of the luminescent layer is not particularly limited. The lower limit thereof is preferably 50 μm and the upper limit is preferably 1,000 μm. When the luminescent layer has a thickness within this range, the contrast of luminescence is sufficiently high under irradiation with light having a specific wavelength. The lower limit of the thickness of the luminescent layer is more preferably 80 μm and the upper limit thereof is more preferably 760 μm. The lower limit is still more preferably 90 μm and the upper limit is still more preferably 500 μm, particularly preferably 300 μm.

The interlayer film for a laminated glass of the present invention may have a wedge-shaped cross section. In the case of the interlayer film for a laminated glass having a wedge-shaped cross section, the wedge angle θ of the wedge shape can be controlled depending on the angle to attach the laminated glass, so that images can be displayed without double image phenomenon. For further preventing double image phenomenon, the lower limit of the wedge angle θ is preferably 0.1 mrad, more preferably 0.2 mrad, still more preferably 0.3 mrad, and the upper limit is preferably 1 mrad, more preferably 0.9 mrad.

In the case where the interlayer film for a laminated glass having a wedge-shaped cross section is produced by, for example, extrusion molding a resin composition using an extruder, the interlayer film may be thinnest at a region slightly inside of the edge on a thinner side thereof (specifically, when the distance from one side to the other side is X, the region of 0× to 0.2× from the edge on the thinner side toward the inside) and thickest at a region slightly inside of the edge on a thicker side thereof (specifically, when the distance from one side to the other side is X, the region of 0× to 0.2× from the edge on the thicker side toward the inside). Herein, such a shape is included in the wedge shape. The distance X from one side to the other side of the interlayer film for a laminated glass is preferably 3 m or shorter, more preferably 2 m or shorter, particularly preferably 1.5 m or shorter, and preferably 0.5 m or longer, more preferably 0.8 m or longer, particularly preferably 1 m or longer.

In the case of the interlayer film for a laminated glass of the present invention having a wedge-shaped cross section, it preferably has a multilayer structure including a luminescent layer and a different layer (hereafter, also referred to as a "shape-adjusting layer"). The cross-sectional shape of the entire interlayer film for a laminated glass can be controlled to have a wedge shape with a certain wedge angle by controlling the thickness of the luminescent layer to be within a certain range and stacking the shape-adjusting layer. The shape-adjusting layer may be stacked on only one or both of the faces of the luminescent layer. Further, multiple shape-adjusting layers may be stacked.

The luminescent layer may have a wedge-shaped cross section or a rectangular cross section. Preferably, the difference between the maximum thickness and the minimum thickness of the luminescent layer is 100 μm or less. In this case, images can be displayed with a certain level of luminance. The difference between the maximum thickness and the minimum thickness of the luminescent layer is more preferably 95 μm or less, still more preferably 90 μm or less.

In the case of the interlayer film for a laminated glass of the present invention having a wedge-shaped cross section, the thickness of the luminescent layer is not particularly limited. The lower limit of the thickness is preferably 50 μm and the upper limit thereof is preferably 700 μm. When the luminescent layer has a thickness within the above range, sufficiently high-contrast images can be displayed. The lower limit of the thickness of the luminescent layer is more preferably 70 μm and the upper limit thereof is more preferably 400 μm. The lower limit is still more preferably 80 μm and the upper limit is still more preferably 150 μm. The lower limit of the thickness of the luminescent layer means the thickness of the thinnest part of the luminescent layer. The upper limit of the thickness of the luminescent layer means the thickness of the thickest part of the luminescent layer.

The shape-adjusting layer is stacked on the luminescent layer to control the cross-sectional shape of the entire interlayer film for a laminated glass into a wedge shape with a certain wedge angle. Preferably, the shape-adjusting layer has a wedge-shaped, triangular, trapezoidal, or rectangular cross section. The cross-sectional shape of the entire interlayer film for a laminated glass can be controlled to be a wedge shape with a certain wedge angle by stacking a shape-adjusting layer having a wedge-shaped, triangular, or trapezoidal cross section. Moreover, the cross-sectional shape of the entire interlayer film for a laminated glass can be controlled using multiple shape-adjusting layers in combination.

The thickness of the shape-adjusting layer is not particularly limited. In view of the practical aspect and sufficient enhancement of the adhesive force and penetration resistance, the lower limit of the thickness is preferably 10 μm and the upper limit thereof is preferably 1,000 μm. The lower limit is more preferably 200 μm and the upper limit is more preferably 800 μm. The lower limit is still more preferably 300 μm. The lower limit of the thickness of the shape-adjusting layer means the thickness of the thinnest part of the shape-adjusting layer. The upper limit of the thickness of the shape-adjusting layer means the thickness of the thickest part of the shape-adjusting layer. When multiple shape-adjusting layers are used in combination, the thickness of the shape-adjusting layer means a total thickness of the shape-adjusting layers.

Figure 1:
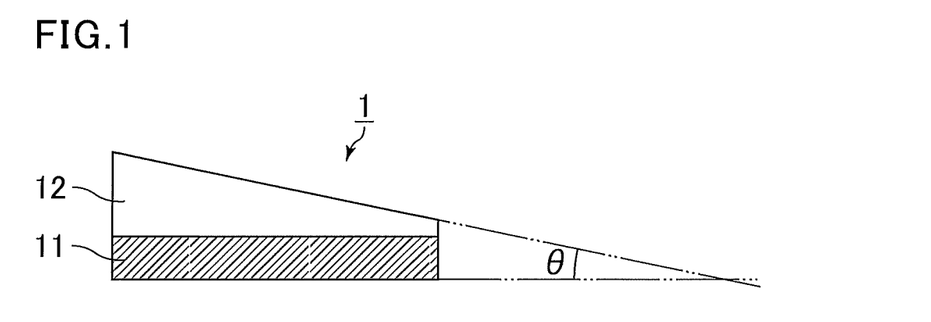
FIG. 1 illustrates a schematic view of an exemplary embodiment of the interlayer film for a laminated glass of the present invention having a wedge-shaped cross section.
Figure 2:
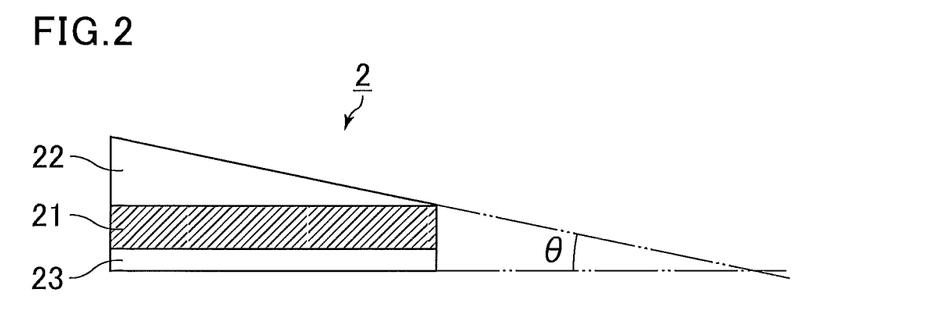
FIG. 2 illustrates a schematic view of an exemplary embodiment of the interlayer film for a laminated glass of the present invention having a wedge-shaped cross section.
Figure 3:
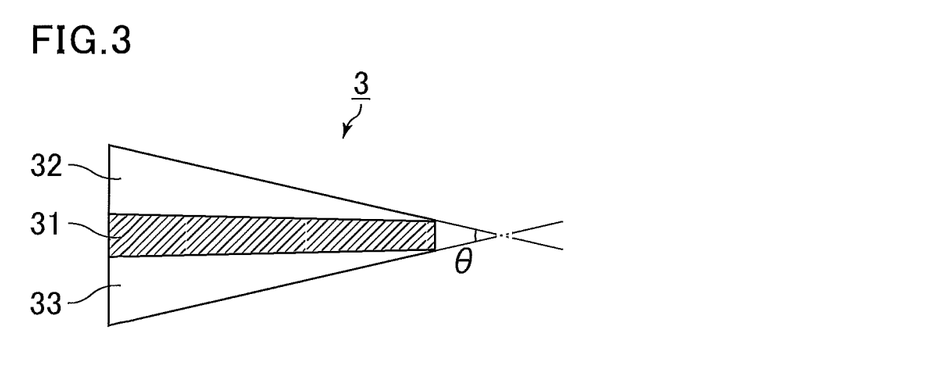
FIG. 3 illustrates a schematic view of an exemplary embodiment of the interlayer film for a laminated glass of the present invention having a wedge-shaped cross section.

FIGS. 1 to 3 each illustrate a schematic view of an exemplary embodiment of the interlayer film for a laminated glass of the present invention having a wedge-shaped cross section. For the convenience of illustration, the interlayer films for a laminated glass and the layers forming the interlayer films for a laminated glass in FIGS. 1 to 3 are illustrated to have different thickness and wedge angles θ from those of the actual products.

FIG. 1 illustrates a cross section of an interlayer film for a laminated glass 1 in the thickness direction. The interlayer film for a laminated glass 1 has a two-layer structure in which a shape-adjusting layer 12 is stacked on one face of a luminescent layer 11 containing a luminescent material. The entire interlayer film for a laminated glass 1 is allowed to have a wedge shape with a wedge angle θ of 0.1 to 1 mrad by using the shape-adjusting layer 12 having a wedge, triangular, or trapezoidal shape together with the luminescent layer 11 having a rectangular shape.

FIG. 2 illustrates a cross section of an interlayer film for a laminated glass 2 in the thickness direction. The interlayer film for a laminated glass 2 has a three-layer structure in which a shape-adjusting layer 22 and a shape-adjusting layer 23 are stacked on respective surfaces of a luminescent layer 21 containing a luminescent material. The entire interlayer film for a laminated glass 2 is allowed to have a wedge shape with a wedge angle θ of 0.1 to 1 mrad by using the shape-adjusting layer 22 having a wedge, triangular, or trapezoidal shape together with the luminescent layer 21 and the shape-adjusting layer 23 both having a rectangular shape with a certain thickness.

FIG. 3 illustrates a cross section of an interlayer film for a laminated glass 3 in the thickness direction. The interlayer film for a laminated glass 3 has a three-layer structure in which a shape-adjusting layer 32 and a shape-adjusting layer 33 are stacked on respective surfaces of a luminescent layer 31 containing a luminescent material. The entire interlayer film for a laminated glass 3 is allowed to have a wedge shape with a wedge angle θ of 0.1 to 1 mrad by using the luminescent layer 31 having a moderate wedge shape with a difference between the maximum thickness and the minimum thickness of 100 μm or less and stacking the wedge-shaped shape-adjusting layers 32 and 33.

The present invention also encompasses a laminated glass including a pair of glass plates and the interlayer film for a laminated glass of the present invention interposed between the pair of glass plates.

The glass plates may be commonly used transparent plate glass. Examples thereof include inorganic glass such as float plate glass, polished plate glass, molded plate glass, wired glass, wire-reinforced plate glass, colored plate glass, heat-absorbing glass, heat-reflecting glass, and green glass. Also usable is UV light-shielding glass in which a UV light-shielding coat layer is formed on the surface of glass. However, such glass is preferably used as a glass plate on a side opposite to the side irradiated with light having a specific wavelength. Moreover, organic plastic plates such as polyethylene terephthalate, polycarbonate, or polyacrylate plates may also be used.

As the glass plates, two or more kinds of glass plates may be used. Exemplary cases thereof include a laminated glass in which the interlayer film for a laminated glass of the present invention is sandwiched between a transparent float plate glass and a colored glass plate such as green glass. Moreover, as the glass plates, two or more kinds of glass plates different in the thickness may be used.

Advantageous Effects of Invention

The present invention can provide a luminescent sheet capable of displaying high-luminance images under irradiation with light and capable of controlling the adhesion to glass, an interlayer film for a laminated glass and a laminated glass each including the luminescent sheet.

DESCRIPTION OF EMBODIMENTS

The present invention is more specifically described in the following with reference to, but not limited to, examples.

Example 1

(1) Preparation of Eu(HFA)$_3$Phen

Europium acetate (Eu(CH$_3$COO)$_3$) in an amount of 4.11 g (12.5 mmol) was dissolved in 50 mL of distilled water. To the solution was added 7.00 g (33.6 mmol) of hexafluoroacetylacetone (HFA), and the mixture was stirred at room temperature for 3 hours. The precipitated solid was filtered, washed with water, and recrystallized using methanol and distilled water to give Eu(HFA)$_3$(H$_2$O)$_2$. Then, 7.20 g of the resulting complex (Eu(HFA)$_3$(H$_2$O)$_2$) and 2.5 g of 1,10-phenanthroline(phen) were dissolved in 100 mL of methanol, followed by heating under reflux for 12 hours. After 12 hours, methanol was distilled off under reduced pressure, thereby obtaining a white product. The white product powder was washed with toluene so that unreacted materials were removed by suction filtration. Subsequently, toluene was distilled off under reduced pressure, thereby preparing a powder. Through recrystallization using a solvent mixture of toluene and hexane, Eu(HFA)$_3$phen was obtained.

(2) Preparation of Polyvinyl Butyral

To a 2 m$^3$ reactor equipped with a stirrer were charged 1700 kg of a 7.5% by mass aqueous solution of PVA (degree of polymerization: 1,700, degree of saponification: 99 mol %), 74.6 kg of n-butyraldehyde, and 0.13 kg of 2,6-di-t-butyl-4-methyl phenol, and the entire mixture was cooled to 14° C. Subsequently, 99.44 L of 30% by mass nitric acid was added to the mixture to initiate the butyralization of PVA. Ten minutes after the end of the addition, the temperature was raised to 65° C. over 90 minutes, followed by further reaction for 120 minutes. Thereafter, the temperature was lowered to room temperature, and the precipitated solid was filtered. The solid was washed ten times with a 10-fold amount (by mass) of ion exchange water. The washed solid was sufficiently neutralized using a 0.3% by mass sodium hydrogen carbonate aqueous solution and was then washed ten times with a 10-fold amount (by mass) of ion exchange water. The resulting solid was dehydrated and dried, thereby obtaining polyvinyl butyral 1 (hereafter, also referred to as "PVB1"). The acetyl group content, degree of butyralization, and hydroxy group content of PVB1 were 0.9 mol %, 68.5 mol %, and 30.6 mol %, respectively.

(3) Production of Interlayer Film for a Laminated Glass and Laminated Glass

A luminous plasticizer solution was prepared by adding 0.2 parts by weight of the Eu(HFA)$_3$phen obtained above and 0.036 parts by weight of acetylacetone magnesium as an adhesion modifier to 40 parts by weight of triethylene glycol di-2-ethylhexanoate (3GO). To the entire amount of the plasticizer solution was added 100 parts by weight of the obtained PVB1, and the mixture was sufficiently kneaded using a mixing roll to prepare a resin composition.

The obtained resin composition was extruded using an extruder to provide an interlayer film for a laminated glass (thickness: 760 μm).

The resulting interlayer film for a laminated glass was sandwiched between a pair of clear glass plates (thickness: 2.5 mm, 5 cm in length×5 cm in width) to prepare a laminate. The laminate was pressed under vacuum at 90° C. for 30 minutes to be press-bonded using a vacuum laminator. The press-bonded laminate was subjected to further 20-minute press-bonding under 14 MPa at 140° C. using an autoclave, thereby obtaining a laminated glass.

Example 2

(1) Preparation of $Tb(HFA)_3Phen$

Terbium acetate $(Tb(CH_3COO)_3)$ in an amount of 4.20 g (12.5 mmol) was dissolved in 50 mL of distilled water. To the solution was added 7.00 g (33.6 mmol) of hexafluoroacetylacetone (HFA, $CF_3COCH_2COCF_3$), and the mixture was stirred at room temperature for 3 hours. The precipitated solid was filtered, washed with water, and recrystallized using methanol and distilled water to give $Tb(HFA)_3(H_2O)_2$. Then, 7.26 g of the obtained complex $Tb(HFA)_3(H_2O)_2$ and 2.5 g of 1,10-phenanthroline(phen) were added to 100 mL of methanol, followed by heating under reflux for 12 hours. After 12 hours, methanol was distilled off under reduced pressure, thereby obtaining a white product. The white product powder was washed with toluene so that unreacted materials were removed by suction filtration. Subsequently, toluene was distilled off under reduced pressure, thereby preparing a powder. Through recrystallization using a solvent mixture of toluene and hexane, $Tb(HFA)_3phen$ was obtained.

(2) Production of Interlayer Film for a Laminated Glass and Laminated Glass

An interlayer film for a laminated glass and a laminated glass were produced in the same manner as in Example 1, except that the obtained $Tb(HFA)_3phen$ was used as luminescent particles.

Comparative Examples 1 and 2

An interlayer film for a laminated glass and a laminated glass were produced in the same manner as in Example 1 or 2, except that 0.0245 parts by weight of magnesium acetate was added instead of 0.036 parts by weight of acetylacetone magnesium.

Comparative Examples 3 and 4

An interlayer film for a laminated glass and a laminated glass were produced in the same manner as in Example 1 or 2, except that 0.0245 parts by weight of magnesium acetate was added instead of 0.036 parts by weight of acetylacetone magnesium and 0.034 parts by weight of acetylacetone was further added.

Example 3

An interlayer film for a laminated glass and a laminated glass were produced in the same manner as in Example 1, except that 0.069 parts by weight of hexafluoroacetylacetone magnesium was added instead of 0.036 parts by weight of acetylacetone magnesium.

Example 4

An interlayer film for a laminated glass and a laminated glass were produced in the same manner as in Example 1, except that 0.052 parts by weight of trifluoroacetylacetone magnesium was added instead of 0.036 parts by weight of acetylacetone magnesium.

Example 5

An interlayer film for a laminated glass and a laminated glass were produced in the same manner as in Example 2, except that 0.069 parts by weight of hexafluoroacetylacetone magnesium was added instead of 0.036 parts by weight of acetylacetone magnesium.

Example 6

An interlayer film for a laminated glass and a laminated glass were produced in the same manner as in Example 2, except that 0.052 parts by weight of trifluoroacetylacetone magnesium was added instead of 0.036 parts by weight of acetylacetone magnesium.

Examples 7 to 10

An interlayer film for a laminated glass and a laminated glass were produced in the same manner as in Example 1 or 2, except that the type and amount of the luminescent material were changed as shown in Table 1 or 2.

Comparative Example 5

An interlayer film for a laminated glass and a laminated glass were produced in the same manner as in Comparative Example 2, except that the amount of the magnesium acetate was changed as shown in Table 2.

Example 11

(1) Preparation of $Eu(TFA)_3Phen$

Europium acetate $(Eu(CH_3COO)_3)$ in an amount of 4.11 g (12.5 mmol) was dissolved in 50 mL of distilled water. To the solution was added 5.18 g (33.6 mmol) of trifluoroacetylacetone (TFA, $CH_3COCH_2COCF_3$), and the mixture was stirred at room temperature for 3 hours. The precipitated solid was filtered, washed with water, and recrystallized using methanol and distilled water to give $Eu(TFA)_3(H_2O)_2$. Then, 5.77 g of the resulting complex $(Eu(TFA)_3(H_2O)_2)$ and 2.5 g of 1,10-phenanthroline(phen) were dissolved in 100 mL of methanol, followed by heating under reflux for 12 hours. After 12 hours, methanol was distilled off under reduced pressure, thereby obtaining a white product. The white product powder was washed with toluene so that unreacted materials were removed by suction filtration. Subsequently, toluene was distilled off under reduced pressure, thereby preparing a powder. Through recrystallization using a solvent mixture of toluene and hexane, $Eu(TFA)_3phen$ was obtained.

(2) Production of Interlayer Film for a Laminated Glass and Laminated Glass

An interlayer film for a laminated glass and a laminated glass were produced in the same manner as in Example 1, except that the obtained Eu(TFA)₃phen was used as luminescent particles.

Example 12

(1) Preparation of Eu(TFA)₃Dpphen

Eu(TFA)₃dpphen was obtained in the same manner as in Example 11, except that 4,7-diphenylphenanthroline was used instead of 1,10-phenanthroline.

(2) Production of Interlayer Film for a Laminated Glass and Laminated Glass

An interlayer film for a laminated glass and a laminated glass were produced in the same manner as in Example 1, except that Eu(TFA)₃dpphen was used as luminescent particles.

Example 13

(1) Preparation of Tb(TFA)₃Phen

Tb(TFA)₃phen was obtained in the same manner as in Example 2, except that trifluoroacetylacetone was used instead of hexafluoroacetylacetone.

(2) Production of Interlayer Film for a Laminated Glass and Laminated Glass

An interlayer film for a laminated glass and a laminated glass were produced in the same manner as in Example 2, except that the obtained Tb(TFA)₃phen was used as luminescent particles.

Examples 14 to 16

An interlayer film for a laminated glass and a laminated glass were produced in the same manner as in Example 1 or 2, except that the type of the luminescent material, the type of the cyclic coordination metal compound, and the amount of the cyclic coordination metal compound were changed as shown in Table 3.

Comparative Example 6

An interlayer film for a laminated glass and a laminated glass were produced in the same manner as in Comparative Example 1, except that 0.0169 parts by weight of potassium acetate was used instead of 0.0245 parts by weight of magnesium acetate.

Comparative Example 7

An interlayer film for a laminated glass and a laminated glass were produced in the same manner as in Comparative Example 1, except that 0.0438 parts by weight of magnesium 2-ethylbutyrate was used instead of 0.0245 parts by weight of magnesium acetate.

Comparative Example 8

An interlayer film for a laminated glass and a laminated glass were produced in the same manner as in Comparative Example 1, except that 0.0266 parts by weight of potassium 2-ethylbutyrate was used instead of 0.0245 parts by weight of magnesium acetate.

Comparative Example 9

An interlayer film for a laminated glass and a laminated glass were produced in the same manner as in Example 11, except that 0.0245 parts by weight of magnesium acetate was added instead of 0.036 parts by weight of acetylacetone magnesium.

Example 17

(1) Resin Composition for Intermediate Layers

To a 2 m³ reactor equipped with a stirrer were charged 1,700 kg of a 7.5% by mass aqueous solution of PVA (degree of polymerization: 2,400, degree of saponification: 88 mol %), 119.4 kg of n-butyraldehyde, and 0.13 kg of 2,6-di-t-butyl-4-methyl phenol, and the entire mixture was cooled to 14° C. Subsequently, 99.44 L of 30% by mass nitric acid was added to the mixture to initiate the butyralization of PVA. Ten minutes after the end of the addition, the temperature was raised to 65° C. over 90 minutes, followed by further reaction for 120 minutes. Thereafter, the temperature was lowered to room temperature, and the precipitated solid was filtered. The solid was washed ten times with a 10-fold amount (by mass) of ion exchange water (washing before neutralization). The washed solid was sufficiently neutralized using a 0.3% by mass sodium hydrogen carbonate aqueous solution and was then washed ten times with a 10-fold amount (by mass) of ion exchange water (washing after neutralization). The resulting solid was dehydrated and dried, thereby obtaining polyvinyl butyral 2 (hereafter, also referred to as "PVB2"). The acetyl group content, butyral group content, and hydroxy group content of PVB2 were 13 mol %, 65 mol %, and 22 mol %, respectively. A resin composition for intermediate layers was prepared by mixing and sufficiently kneading 60 parts by weight of triethylene glycol di-2-ethylhexanoate (3GO) with 100 parts by weight of polyvinyl butyral 2 using a mixing roll.

(2) Resin Composition for Surface Layers

A plasticizer solution was prepared by adding 0.036 parts by weight of acetylacetone magnesium as an adhesion modifier and 0.2 parts by weight of Eu(HFA)₃phen obtained in Example 1 to 38.5 parts by weight of triethylene glycol di-2-ethylhexanoate (3GO). The entire amount of the plasticizer solution was mixed and sufficiently kneaded with 100 parts by weight of PVB1 obtained in Example 1 using a mixing roll to give a resin composition for surface layers.

(3) Production of Interlayer Film for a Laminated Glass

The resin composition for intermediate layers and the resin composition for surface layers were co-extruded using a coextruder to prepare an interlayer film for a laminated glass in which a surface layer, an intermediate layer, and a surface layer were stacked in the stated order. The intermediate layer had a thickness of 100 μm, the surface layers each had a thickness of 350 μm, and the interlayer film for a laminated glass had a thickness of 800 μm.

(4) Production of Laminated Glass

The resulting interlayer film for a laminated glass was sandwiched between a pair of clear glass plates (thickness: 2.5 mm, 5 cm in length×5 cm in width) to prepare a laminate. The laminate was pressed under vacuum at 90° C. for 30 minutes to be press-bonded using a vacuum laminator. The press-bonded laminate was subjected to further 20-minute press-bonding under 14 MPa at 140° C. using an autoclave, thereby obtaining a laminated glass.

Example 18

An interlayer film for a laminated glass and a laminated glass were produced in the same manner as in Example 17, except that Tb(HFA)₃phen was used instead of Eu(HFA)₃phen.

Example 19

(1) Resin Composition for Intermediate Layers

A plasticizer solution was prepared by adding 0.2 parts by weight of Eu(HFA)$_3$phen obtained in Example 1 to 60 parts by weight of triethylene glycol di-2-ethylhexanoate (3GO). The entire amount of the plasticizer solution was mixed and sufficiently kneaded with 100 parts by weight of PVB2 using a mixing roll to give a resin composition for intermediate layers.

(2) Resin Composition for Surface Layers

A plasticizer solution was prepared by adding 0.036 parts by weight of acetylacetone magnesium as an adhesion modifier to 38.5 parts by weight of triethylene glycol di-2-ethylhexanoate (3GO). The entire amount of the plasticizer solution was mixed and sufficiently kneaded with 100 parts by weight of PVB1 using a mixing roll to give a resin composition for surface layers.

(3) Production of Interlayer Film for a Laminated Glass

The resin composition for intermediate layers and the resin composition for surface layers were co-extruded using a coextruder to prepare an interlayer film for a laminated glass in which a surface layer, an intermediate layer, and a surface layer were stacked in the stated order. The intermediate layer had a thickness of 100 µm, the surface layers each had a thickness of 350 µm, and the interlayer film for a laminated glass had a thickness of 800 µm.

(4) Production of Laminated Glass

The resulting interlayer film for a laminated glass was sandwiched between a pair of clear glass plates (thickness: 2.5 mm, 5 cm in length×5 cm in width) to prepare a laminate. The laminate was pressed under vacuum at 90° C. for 30 minutes to be press-bonded using a vacuum laminator. The press-bonded laminate was subjected to further 20-minute press-bonding under 14 MPa at 140° C. using an autoclave, thereby obtaining a laminated glass.

Example 20

(1) Resin Composition for Intermediate Layers

A plasticizer solution was prepared by adding 0.2 parts by weight of Eu(HFA)$_3$phen obtained in Example 1 to 60 parts by weight of triethylene glycol di-2-ethylhexanoate (3GO). The entire amount of the plasticizer solution was mixed and sufficiently kneaded with 100 parts by weight of PVB2 using a mixing roll to give a resin composition for intermediate layers.

(2) Resin Composition for Surface Layers

A plasticizer solution was prepared by adding 0.036 parts by weight of acetylacetone magnesium as an adhesion modifier and 0.2 parts by weight of Eu(HFA)$_3$phen obtained in Example 1 to 38.5 parts by weight of triethylene glycol di-2-ethylhexanoate (3GO). The entire amount of the plasticizer solution was mixed and sufficiently kneaded with 100 parts by weight of PVB1 using a mixing roll to give a resin composition for surface layers.

(3) Production of Interlayer Film for a Laminated Glass

The resin composition for intermediate layers and the resin composition for surface layers were co-extruded using a coextruder to prepare an interlayer film for a laminated glass in which a surface layer, an intermediate layer, and a surface layer were stacked in the stated order. The intermediate layer had a thickness of 100 µm, the surface layers each had a thickness of 350 µm, and the interlayer film for a laminated glass had a thickness of 800 µm.

(4) Production of Laminated Glass

The resulting interlayer film for a laminated glass was sandwiched between a pair of clear glass plates (thickness: 2.5 mm, 5 cm in length×5 cm in width) to prepare a laminate. The laminate was pressed under vacuum at 90° C. for 30 minutes to be press-bonded using a vacuum laminator. The press-bonded laminate was subjected to further 20-minute press-bonding under 14 MPa at 140° C. using an autoclave, thereby obtaining a laminated glass.

Comparative Example 10

An interlayer film for a laminated glass and a laminated glass were produced in the same manner as in Example 17, except that 0.0245 parts by weight of magnesium acetate was added instead of 0.036 parts by weight of acetylacetone magnesium.

Comparative Example 11

An interlayer film for a laminated glass and a laminated glass were produced in the same manner as in Example 18, except that 0.0245 parts by weight of magnesium acetate was added instead of 0.036 parts by weight of acetylacetone magnesium.

(Evaluation)

The laminated glasses obtained in the examples and the comparative examples were evaluated by the following methods. Tables 1, 2, 3, or 4 show the results.

(1) Evaluation of Luminance

Each obtained laminated glass having a size of 5 cm in length×5 cm in width was placed in a dark room, and the entire surface thereof was irradiated with light from a high power xenon light source ("REX-250" available from Asahi Spectra Co., Ltd., irradiation wavelength: 405 nm) set at a position of 10 cm distant from the plane of the laminated glass in the vertical direction. The luminance was measured with a luminance meter ("SR-3AR" available from Topcon Technohouse Corporation) set at a position at an angle of 45 degrees relative to the plane of the irradiated laminated glass at a shortest distance of 35 cm from the plane of the laminated glass and on the side under irradiation with light.

(2) Determination of Pummel Value/Evaluation of Penetration Resistance (of Laminated Glass)

Each obtained laminated glass was allowed to stand at a temperature of −18° C.±0.6° C. for 16 hours, and the central portion (part of 150 mm in length×150 mm in width) of the resulting laminated glass was hit with a hammer (head weight of 0.45 kg) until the shattered glass had a particle size of 6 mm or smaller. The degree of exposure of the film after the glass partially fell off was measured, and the pummel value was determined based on Table 5.

A laminated glass having a pummel value within a range of 1 to 7 is considered to have practical penetration resistance.

TABLE 1

| | | | | Example 1 | Example 2 | Example 3 | Example 4 | Example 5 | Example 6 | Example 7 | Example 8 |
|---|---|---|---|---|---|---|---|---|---|---|---|
| Interlayer film | Thermoplastic resin | PVB1 | phr | 100 | 100 | 100 | 100 | 100 | 100 | 100 | 100 |
| | Plasticizer | 3GO | phr | 40 | 40 | 40 | 40 | 40 | 40 | 40 | 40 |
| | Luminescent material | Eu(hfa)$_3$phen | phr | 0.2 | — | 0.2 | 0.2 | — | — | 0.4 | — |
| | | Tb(hfa)$_3$phen | phr | — | 0.2 | — | — | 0.2 | 0.2 | — | 0.4 |
| | Adhesion modifier | Cyclic coordination metal compound | Acetylacetone magnesium | phr | 0.036 | 0.036 | — | — | — | — | 0.036 | 0.036 |
| | | | Hexafluoroacetylacetone magnesium | phr | — | — | 0.069 | — | 0.069 | — | — | — |
| | | | Trifluoroacetylacetone magnesium | phr | — | — | — | 0.052 | — | 0.052 | — | — |
| | | Compound other than cyclic coordination metal compound | Magnesium acetate | phr | — | — | — | — | — | — | — | — |
| | | | Potassium acetate | phr | — | — | — | — | — | — | — | — |
| | | | Magnesium 2-ethylbutyrate | phr | — | — | — | — | — | — | — | — |
| | | | Potassium 2-ethylbutyrate | phr | — | — | — | — | — | — | — | — |
| | | Others | Acetylacetone | phr | — | — | — | — | — | — | — | — |
| Evaluation | | Luminance | cd/m$^2$ | 150 | 300 | 145 | 148 | 280 | 290 | 295 | 580 |
| | | Pummel value | — | 6 | 6 | 6 | 6 | 6 | 6 | 6 | 6 |

TABLE 2

| | | | | Example 9 | Example 10 | Comparative Example 1 | Comparative Example 2 | Comparative Example 3 | Comparative Example 4 | Comparative Example 5 |
|---|---|---|---|---|---|---|---|---|---|---|
| Interlayer film | Thermoplastic resin | PVB1 | phr | 100 | 100 | 100 | 100 | 100 | 100 | 100 |
| | Plasticizer | 3GO | phr | 40 | 40 | 40 | 40 | 40 | 40 | 40 |
| | Luminescent material | Eu(hfa)$_3$phen | phr | 0.05 | — | 0.2 | — | 0.2 | — | — |
| | | Tb(hfa)$_3$phen | phr | — | 0.05 | — | 0.2 | — | 0.2 | 0.2 |
| | Adhesion modifier | Cyclic coordination metal compound | Acetylacetone magnesium | phr | 0.036 | 0.036 | — | — | — | — | — |
| | | | Hexafluoroacetylacetone magnesium | phr | — | — | — | — | — | — | — |
| | | | Trifluoroacetylacetone magnesium | phr | — | — | — | — | — | — | — |
| | | Compound other than cyclic coordination metal compound | Magnesium acetate | phr | — | — | 0.0245 | 0.0245 | 0.0245 | 0.0245 | 0.0122 |
| | | | Potassium acetate | phr | — | — | — | — | — | — | — |
| | | | Magnesium 2-ethylbutyrate | phr | — | — | — | — | — | — | — |
| | | | Potassium 2-ethylbutyrate | phr | — | — | — | — | — | — | — |
| | | Others | Acetylacetone | phr | — | — | — | — | 0.034 | 0.034 | — |
| Evaluation | | Luminance | cd/m$^2$ | 50 | 90 | 2 | 3 | 2 | 3 | 7 |
| | | Pummel value | — | 6 | 6 | 6 | 6 | 5 | 5 | 5 |

TABLE 3

| | | | | Example 11 | Example 12 | Example 13 | Example 14 | Example 15 |
|---|---|---|---|---|---|---|---|---|
| Interlayer film | Thermoplastic resin | PVB1 | phr | 100 | 100 | 100 | 100 | 100 |
| | Plasticizer | 3GO | phr | 40 | 40 | 40 | 40 | 40 |
| | Luminescent material | Eu(hfa)$_3$phen | phr | — | — | — | — | — |
| | | Tb(hfa)$_3$phen | phr | — | — | — | — | — |
| | | Eu(tfa)$_3$phen | phr | 0.2 | — | — | 0.2 | — |
| | | Eu(tfa)$_3$dpphen | phr | — | 0.2 | — | — | 0.2 |
| | | Tb(tfa)$_3$phen | phr | — | — | 0.2 | — | — |
| | Adhesion modifier | Cyclic coordination metal compound | Acetylacetone magnesium | phr | 0.036 | 0.036 | 0.036 | — | — |
| | | | Hexafluoroacetylacetone magnesium | phr | — | — | — | 0.052 | 0.052 |
| | | | Trifluoroacetylacetone magnesium | phr | — | — | — | — | — |
| | | Compound other than cyclic | Magnesium acetate | phr | — | — | — | — | — |
| | | | Potassium acetate | phr | — | — | — | — | — |
| | | | Magnesium 2-ethylbutyrate | phr | — | — | — | — | — |

TABLE 3-continued

|  |  |  |  |  |  |  |  |  |
|---|---|---|---|---|---|---|---|---|
|  |  | coordination metal compound | Potassium 2-ethylbutyrate | phr | — | — | — | — | — |
| Evaluation |  | Others | Acetylacetone | phr | — | — | — | — | — |
|  |  |  | Luminance | cd/m² | 140 | 160 | 290 | 140 | 155 |
|  |  |  | Pummel value | — | 6 | 6 | 6 | 6 | 6 |

|  |  |  |  |  | Example 16 | Comparative Example 6 | Comparative Example 7 | Comparative Example 8 | Comparative Example 9 |
|---|---|---|---|---|---|---|---|---|---|
| Interlayer film | Thermoplastic resin | PVB1 |  | phr | 100 | 100 | 100 | 100 | 100 |
|  | Plasticizer | 3GO |  | phr | 40 | 40 | 40 | 40 | 40 |
|  | Luminescent material | Eu(hfa)₃phen |  | phr | — | 0.2 | 0.2 | 0.2 | — |
|  |  | Tb(hfa)₃phen |  | phr | — | — | — | — | — |
|  |  | Eu(tfa)₃phen |  | phr | — | — | — | — | 0.2 |
|  |  | Eu(tfa)₃dpphen |  | phr | — | — | — | — | — |
|  |  | Tb(tfa)₃phen |  | phr | 0.2 | — | — | — | — |
| Adhesion modifier | Cyclic coordination metal compound | Acetylacetone magnesium |  | phr | — | — | — | — | — |
|  |  | Hexafluoroacetylacetone magnesium |  | phr | 0.052 | — | — | — | — |
|  |  | Trifluoroacetylacetone magnesium |  | phr | — | — | — | — | — |
|  | Compound other than cyclic coordination metal compound | Magnesium acetate |  | phr | — | — | — | — | 0.0245 |
|  |  | Potassium acetate |  | phr | — | 0.0169 | — | — | — |
|  |  | Magnesium 2-ethylbutyrate |  | phr | — | — | 0.0438 | — | — |
|  |  | Potassium 2-ethylbutyrate |  | phr | — | — | — | 0.0266 | — |
|  | Others | Acetylacetone |  | phr | — | — | — | — | — |
| Evaluation |  | Luminance |  | cd/m² | 295 | 2 | 2 | 2 | 2 |
|  |  | Pummel value |  | — | 6 | 6 | 6 | 6 | 6 |

TABLE 4

|  |  |  |  | Example 17 | Example 18 | Example 19 | Example 20 | Comparative Example 10 | Comparative Example 11 |
|---|---|---|---|---|---|---|---|---|---|
| Surface layer | Thermoplastic resin | PVB1 | phr | 100 | 100 | 100 | 100 | 100 | 100 |
|  | Plasticizer | 3GO | phr | 38.5 | 38.5 | 38.5 | 38.5 | 38.5 | 38.5 |
|  | Luminescent material | Eu(hfa)₃phen | phr | 0.2 | — | — | 0.2 | 0.2 | — |
|  |  | Tb(hfa)₃phen | phr | — | 0.2 | — | — | — | 0.2 |
|  | Adhesion modifier | Acetylacetone magnesium | phr | 0.036 | 0.036 | 0.036 | 0.036 | — | — |
|  |  | Magnesium acetate | phr | — | — | — | — | 0.0245 | 0.0245 |
|  | Layer thickness |  | μm | 350 | 350 | 350 | 350 | 350 | 350 |
| Intermediate layer | Thermoplastic resin | PVB2 | phr | 100 | 100 | 100 | 100 | 100 | 100 |
|  | Plasticizer | 3GO | phr | 60 | 60 | 60 | 60 | 60 | 60 |
|  | Luminescent material | Eu(hfa)₃phen | phr | — | — | 0.2 | 0.2 | — | — |
|  |  | Tb(hfa)₃phen | phr | — | — | — | — | — | — |
|  | Layer thickness |  | μm | 100 | 100 | 100 | 100 | 100 | 100 |
| Surface layer | Thermoplastic resin | PVB1 | phr | 100 | 100 | 100 | 100 | 100 | 100 |
|  | Plasticizer | 3GO | phr | 38.5 | 38.5 | 38.5 | 38.5 | 38.5 | 38.5 |
|  | Luminescent material | Eu(hfa)₃phen | phr | 0.2 | — | — | 0.2 | 0.2 | — |
|  |  | Tb(hfa)₃phen | phr | — | 0.2 | — | — | — | 0.2 |
|  | Adhesion modifier | Acetylacetone magnesium | phr | 0.036 | 0.036 | 0.036 | 0.036 | — | — |
|  |  | Magnesium acetate | phr | — | — | — | — | 0.0245 | 0.0245 |
|  | Layer thickness |  | μm | 350 | 350 | 350 | 350 | 350 | 350 |
| Evaluation | Luminance |  | cd/m² | 150 | 300 | 30 | 170 | 2 | 3 |
|  | Pummel value |  | — | 6 | 6 | 6 | 6 | 6 | 6 |

TABLE 5

| Degree of exposure of interlayer film (area %) | Pummel value |
|---|---|
| 90 < Degree of exposure ≤ 100 | 0 |
| 85 < Degree of exposure ≤ 90 | 1 |
| 60 < Degree of exposure ≤ 85 | 2 |
| 40 < Degree of exposure ≤ 60 | 3 |
| 20 < Degree of exposure ≤ 40 | 4 |
| 10 < Degree of exposure ≤ 20 | 5 |
| 5 < Degree of exposure ≤ 10 | 6 |
| 2 < Degree of exposure ≤ 5 | 7 |
| Degree of exposure ≤ 2 | 8 |

INDUSTRIAL APPLICABILITY

The present invention can provide a luminescent sheet capable of displaying high-luminance images under irradiation with light and capable of controlling the adhesion to glass, and an interlayer film for a laminated glass and a laminated glass each including the luminescent sheet.

REFERENCE SIGNS LIST

1 Interlayer film for a laminated glass
11 Luminescent layer
12 Shape-adjusting layer 2 Interlayer film for a laminated glass
21 Luminescent layer
22 Shape-adjusting layer
23 Shape-adjusting layer
3 Interlayer film for a laminated glass
31 Luminescent layer
32 Shape-adjusting layer
33 Shape-adjusting layer

The invention claimed is:

1. A luminescent sheet comprising a single layer comprising:
a thermoplastic resin;
a luminescent material; and
a cyclic coordination metal compound having a six-membered ring structure formed by coordinating an organic compound having in a molecule two or more atoms of at least one member selected from the group consisting of oxygen, phosphor, nitrogen, and sulfur, to at least one metal selected from the group consisting of an alkali metal and an alkaline earth metal,
wherein the cyclic coordination metal compound contains acetylacetone, and
wherein an amount of the luminescent material in the luminescent sheet is 0.1 parts by weight or more relative to 100 parts by weight of the thermoplastic resin.

2. The luminescent sheet according to claim 1, further comprising a plasticizer.

3. The luminescent sheet according to claim 1,
wherein the luminescent material is a compound having a terephthalic acid ester structure or a lanthanoid complex.

4. The luminescent sheet according to claim 1,
wherein the cyclic coordination metal compound is acetylacetone magnesium.

5. An interlayer film for a laminated glass comprising the luminescent sheet according to claim 1.

6. A laminated glass comprising:
a pair of glass plates; and
the interlayer film for a laminated glass according to claim 5 interposed between the pair of glass plates.

* * * * *